May 12, 1964
W. G. WING
3,132,520
ACCELEROMETER
Filed April 22, 1958
2 Sheets-Sheet 1
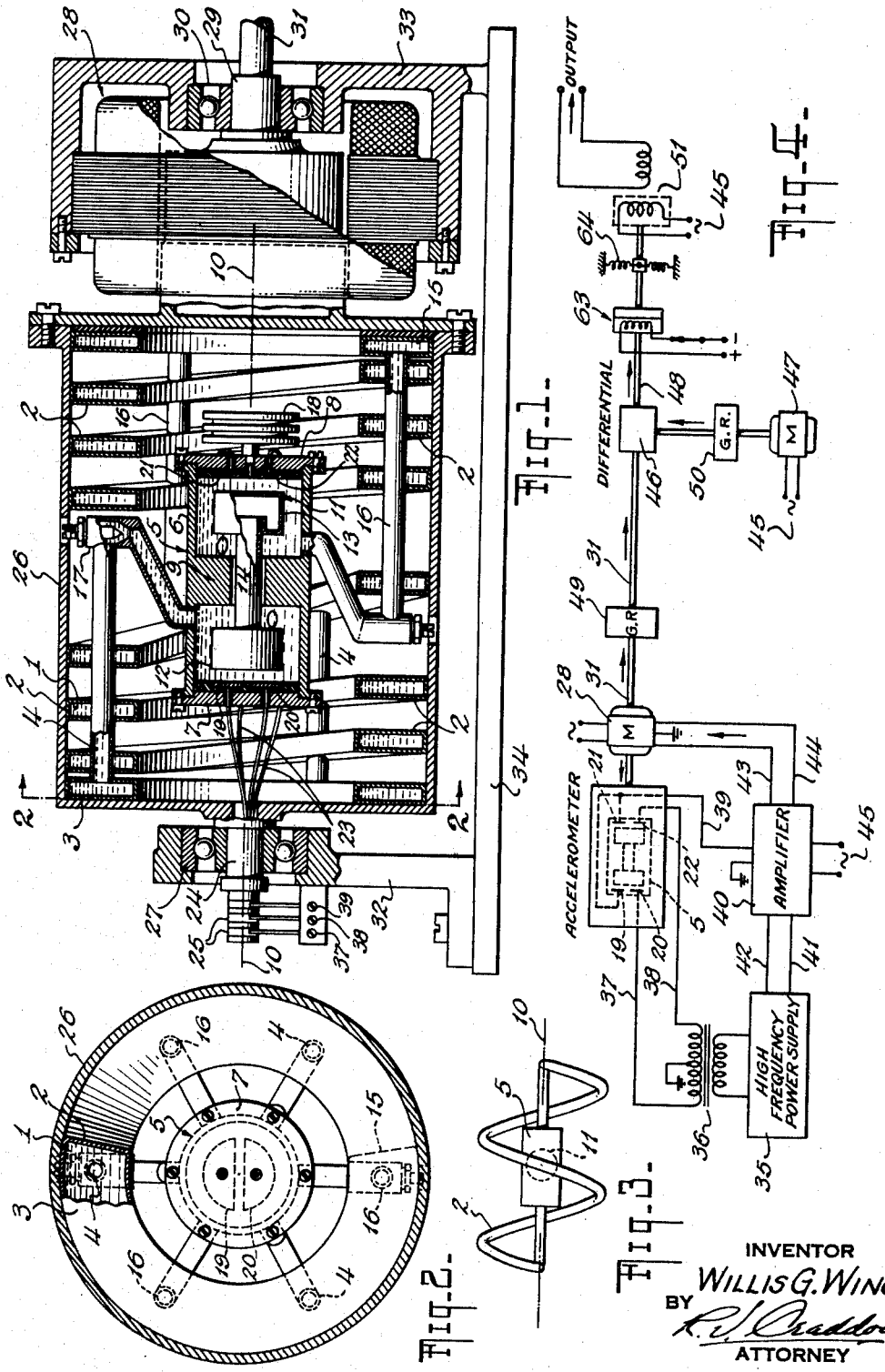
INVENTOR
WILLIS G. WING
BY
*R. J. Craddock*
ATTORNEY May 12, 1964

W. G. WING 3,132,520

ACCELEROMETER

Filed April 22, 1958

INVENTOR
WILLIS G. WING
BY
ATTORNEY

United States Patent Office 3,132,520
Patented May 12, 1964

3,132,520
ACCELEROMETER
Willis G. Wing, Glen Head, N.Y., assignor to Sperry Rand Corporation, a corporation of Delaware
Filed Apr. 22, 1958, Ser. No. 730,143
15 Claims. (Cl. 73—490)

More particularly, my invention relates to linear accelerometers and to accelerometers of the integrating type. The preferred embodiment of my invention hereinafter described is an accelerometer of the double-integrating type wherein, by virtue of the construction and the manner of operation thereof, a measure of the second time integral of a detected linear acceleration is provided by way of an angular shaft displacement. In other words, the accelerometer of the present invention avoids any need for separate or added equipment functioning as integrators.

In the fields of navigation and particularly in navigation systems designated as those of the inertial type, it is necessary to provide components such as accelerometers which are highly sensitive to accelerations of low magnitude while having such high precision as to provide accurate measurements of accelerations over a fairly wide range. Since the acceleration signal is the primary signal in many of such systems, from which is derived a measure of displacement, such as vehicle displacement, and, if desired, a measure of velocity, such as vehicle velocity, the acceleration-sensing unit or accelerometer should have an extremely accurate scale factor. That is to say, the unit must provide an extremely accurate measure of the acceleration to which it is subjected, and in high precision systems embodying such units, it is desirable that such units give a measure of the applied acceleration with an accuracy of, for example, one part in 20,000 or greater.

It is therefore a primary object of the present invention to provide an accelerometer which has a very accurate scale factor and an accuracy of the order above pointed out, and also in providing one which by virtue of its inherent nature additionally performs an accurate double time integrating function.

It is a further object to provide an accelerometer which is particularly adapted for use as a double-integrating accelerometer and which is so constructed and arranged that the acceleration forces acting on the acceleration-sensitive element of the accelerometer is offset by a force proportional to an angular acceleration, the angular acceleration being derived from the rotor of a driving motor, and a measure of displacement such as vehicle displacement due to such linear acceleration being obtainable from the angular displacement of the motor rotor.

More particularly, it is an object of the present invention to provide a linear acceleration-sensitive accelerometer wherein a fluid carried in a generally helical passageway is supplied to opposite sides of a chamber within which a test mass responsive to linear accelerations is movably disposed within the fluid therein, the angular acceleration of the fluid carrying passageway being controlled in accordance with movements of the test mass under the influence of linear accelerations and in such manner that the angular acceleration of the rotated passageway is made proportional to the linear acceleration.

It is a further object of the present invention to provide an accelerometer of the foregoing type wherein the generally helical passageway and the chamber within which the test mass is disposed are rotated at some predetermined initial speed in the absence of any linear accelerations affecting the same.

Still more particularly, it is an object of this invention to provide an accelerometer of the character last above described which includes means and mechanisms for compensating for the initial rotational speed of the apparatus so that an output device such as a signal generator, for example, of the electrical type, with a counter mechanism such as one of the Veeder-Root type, will not be actuated while the apparatus is driven at its initial constant speed and is unaffected by linear accelerations.

Other objects reside in providing accelerometers of the foregoing types in which compensation is effected for temperature gradients across the apparatus; in which provision is made for accommodating fluid expansions and contractions in the fluid system due to ambient temperature conditions; and, further, in which means are provided for preventing the scale value from being affected by variations in operating temperature.

With the foregoing and still other objects in view, my invention includes the novel elements and the combinations and arrangements of elements described below and illustrated in an exemplary form in the accompanying drawings, in which—

FIG. 1 is a longitudinal view, partly in section, of the preferred rotatable assembly of the accelerometer of the present invention;

FIG. 2 is a sectional view, with parts broken away, taken transversely of the instrument shown in FIG. 1 and taken in about the plane 2—2 thereof;

FIG. 3 is a diagrammatic view serving to illustrate in a very simplified manner the general structure and principle of operation of my invention; and FIG. 4 is a diagrammatic illustration of one form of my invention arranged to operate in a preferred manner.

Figure 5:
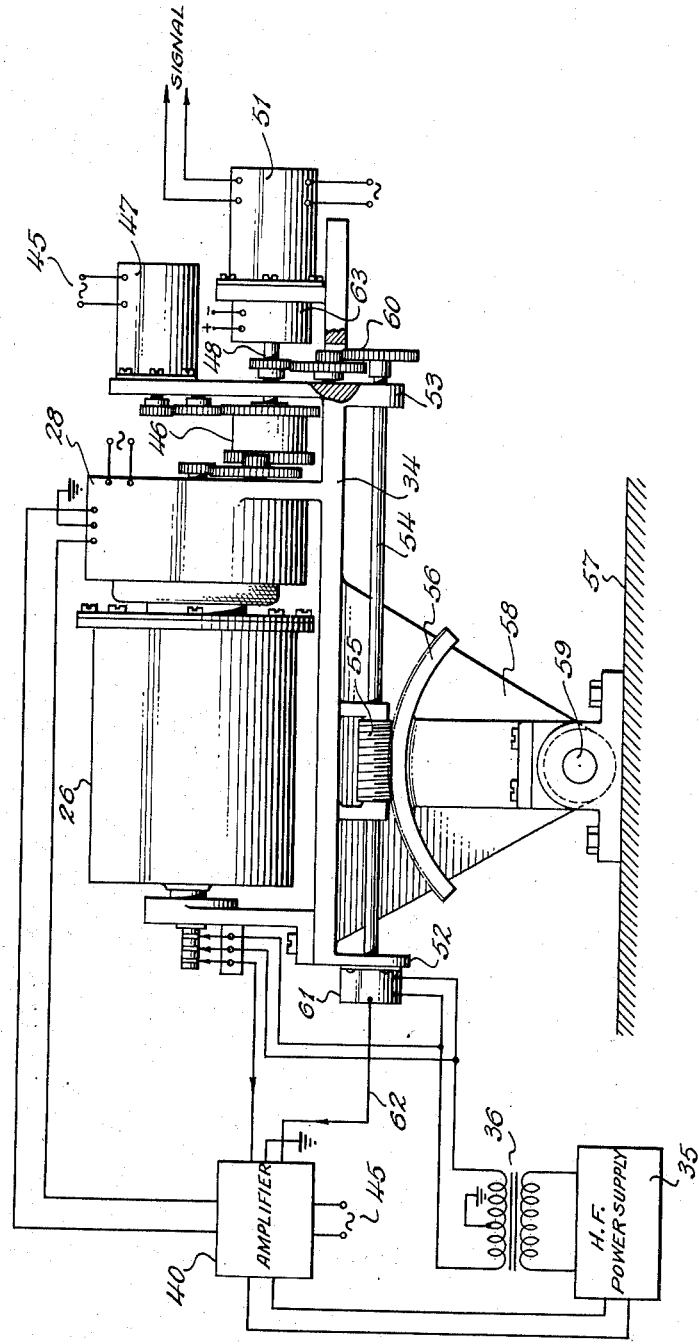
FIG. 5 illustrates a test set-up for the accelerometer of the present invention.

For a better understanding of the following description of my invention, a simplified explanation of the principal features and method of operation will first be set forth. Linear accelerations will be responded to by a test mass disposed within a fluid filled chamber. The test mass, from a mathematical standpoint, is a negative quantity and, physically, is the mass of fluid displaced by a float less the mass of the float. A generally helical passageway or conduit for the flow of fluid therethrough is connected at one end to communicate with the chamber to one side of the float and the other end of the passageway is connected to communicate with the chamber to the other side of said float. Both the helical passageway and the chamber are filled with fluid, preferably a liquid of the character hereinafter set forth and comprise a fluid circulating member. A pick-up is operatively associated with the test mass and provides a signal controlling a motor which rotates the helical passageway and, preferably, both the passageway and the chamber. The motor is so controlled that its angular accelerations are responsive to the pick-up signal and thereby create pressure differentials on opposite sides of the test mass serving to apply forces thereto offsetting those of the linear accelerations influencing the test mass. With a system having extremely rapid response, the test mass will experience very little movement. When the forces acting on the test mass are equal and opposite, the rotational acceleration will be proportional to the linear acceleration. Hence, the angular displacement of the driving motor will be a measure of the second time integral of the linear acceleration. moreover, since, as will be shown, the parameters which determine the opposing forces on the test mass are inherently highly stable, the overall scale value is also highly stable. Also, the nature of the device is such that its output is the second time integral of the applied acceleration. Therefor, additional losses due to separate integrating devices and the like are absent from the present invention.

Referring now to FIG. 1, I have shown the passageway or conduit 1 as formed from tubing such as the rectangular tube 2 which is arranged to lie in a generally helical path. At one end thereof, such as the end 3, a passageway 4 leads to a chamber 5 which is herein illustrated as cylindrical in form with its longitudinal axis coincident with the longitudinal axis of rotation of the conduit and these coincident axes are adapted to be disposed in parallelism with the direction of linear accelerations to be detected. The chamber 5 comprises a preferably cylindrical casing 6 having end closures 7 and 8. Although the casing 6 could be of uniform internal diameter throughout and a test mass of spherical form could be disposed therewithin, the mass having a diameter only slightly less than the internal diameter of the chamber so as to provide a very narrow passageway between the mass and the casing for the flow of fluid therebetween, I prefer to form casing 6 with a restriction in a central zone thereof. In the embodiment illustrated, the restriction is formed by the wall 9 which has an opening at the center thereof which is preferably cylindrical and coaxial with the longitudinal axis of the rotating apparatus, which latter axis is designated by the dot-dash line 10. (Also, see FIG. 3.) When employing a restriction in the chamber, I prefer to use a generally dumbbell-shaped float such as that indicated at 11. This may comprise two cylindrical end portions 12 and 13 connected together by means of a cylindrical tube 14. The float 11 as shown is preferably hollow and may be made of light weight metal enabling floatation within the fluid. It will be noted that the tube 14 and the restriction defined by the wall 9 provide an extremely small passageway therebetween which permits fluid flow from one side of the chamber to the other. The float means 11 has a geometrical shape that is symmetrical to the axis of the chamber and that with a portion of the wall of the chamber provides the restrictive axial passageway for the fluid between the respective ends of the chamber.

The end 15 of the helical passageway opposite to the end designated as 3 is likewise connected with the chamber 5 by means of the passage 16 as illustrated. It will be noted that the end 3 of the helical passageway communicates with the left-hand side of chamber 5 while the end 15 of the helical passageway communicates with the right-hand side of the chamber 5. However, it is to be noted that the connecting passageways 4 and 16 extend longitudinally of the apparatus and, in each case, preferably beyond the mid-plane thereof before these passageways are reversely bent for connection with the chamber. This arrangement is for the purpose of compensating, at least in part, for any temperature gradient that may exist longitudinally of the apparatus and which would otherwise produce pressure differentials within the chamber 5 thus affecting the test mass.

The radially and longitudinally extending portions of the connecting passageways are illustrated as of substantially equal extent to both sides of the mid-plane. Hence, fluid in these various portions will lie in corresponding transverse planes and therefore all of the fluid within said portions will be subjected to like temperatures of any temperature gradient extending axially of the apparatus and compensation will be affected. Since the instrument is of a highly precise nature, the permissible magnitude of any effects due to such temperature gradients is small.

For initial adjustment purposes, I have illustrated a valve arrangement in the fluid path for providing a more exact adjustment of the circulation of fluid through the chamber. For exemplary purposes, such a valve is shown at 17 as disposed in the passageways 4 and 16 leading from the helical passageway to the chamber. Actually, such a valve or valves may be disposed in any convenient location along the path of the fluid. It should be noted that though the maximum resistance to fluid flow in the fluid circulating member should occur between the tubular element of the float 11 and the restriction in the chamber 5 and all other resistance to fluid flow throughout the remainder of the fluid path should be extremely small compared thereto, the valve 17 will permit adjustment of these relative resistances so as to afford optimum performance.

To permit fluid expansion and contraction within the system due to ambient temperature changes and the like, I provide an expansible and contractable bellows 18 which, in the embodiment illustrated, is secured to the end closure 8 of the chamber 5, the closure 8 being provided with an opening therethrough affording communication between the interior of the bellows and the chamber for the flow of fluid therebetween. Since the assembly is rotated, I prefer to mount the bellows symmetrically with respect to the axis 10 of the apparatus.

The fluid in the system is preferably a liquid and one which is preferably characterized by high density, low viscosity and low temperature coefficient of expansion. Other properties such as non-corrosiveness, high stability in liquid state and the like, are also desirable. For example, I may use a liquid of the character of that commercially available under the name of "Fluorolube." Liquid completely fills the fluid circulating member, to wit, the chamber 5, the helical passageway or conduit connected to the chamber and the bellows 18.

Electrical pick-ups are operatively associated with the inertial mass 11 and in the embodiment illustrated I have shown a preferred type of pick-off and a preferred disposition thereof. Capacity type pick-up elements are mounted on the interior face of the closures 7 and 8. A pair of condenser plates 19 and 20, for example, of semicircular configuration, are mounted on the interior face of closure 7, as illustrated in dotted lines in FIG. 2. A similarly shaped and arranged pair of plates 21 and 22 are mounted on the interior of closure 8. These plates may be embedded in electrical insulating material as shown and securely fastened in any desired manner to the closure elements. Lead wires such as those indicated at 23 are connected, respectively, with the condenser plates 19–22 and are led through the hollow shaft 24 to suitable slip rings 25. Brushes (diagrammatically shown) which engage the slip rings, serve to connect the capacitor plates with the external circuit shown in FIG. 4.

The assemblage of elements hereinabove described, including the tubular element forming the helical passageway and the chamber with the test mass therein, are all preferably mounted for rotation within a casing 26. Although not herein illustrated, the casing 26 or supporting means is preferably formed of thermal insulation material or carries a coating of such material to insulate the assemblage from external temperature changes so far as possible. One end of casing 26 is provided with a hollow shaft 24 which is journalled in a suitable bearing 27. The other end of casing 26 is secured to the rotor of a motor indicated generally at 28, the rotor shaft 29 thereof being journalled in a suitable bearing 30. The output shaft of motor 28 is indicated at 31 both in FIG. 1 and in FIG. 4. The bearings 27 and 30 are shown for illustrative purposes as mounted, respectively, in upstanding legs 32 and 33 of a platform or supporting frame 34.

The foregoing has been a physical description of a preferred embodiment of the present invention and indicates, in general, the purposes of various features. A more complete discussion of the theory may serve to clarify certain points. It might be well first to indicate the means by which the float is maintained at a null position while at the same time having freedom to move axially in response to accelerations along its axis of symmetry. If the float geometry is appropriate, its density being less than that of the fluid, and the fluid body is rotated rapidly about the axis 10 of casing 26, then the float will align itself (as a result of pressure distribution within the rotating fluid body) coaxially with the axis of rotation. For this reason, in accordance with the preferred embodiment of the present invention, the casing is rotated at a bias speed when the time integral of the applied acceleration is zero. Applied linear accelerations will then cause speed changes around this bias speed. It is evident that means can be provided, as herein illustrated, to subtract from the output of the device the bias angularly velocity.

In developing the theory of the accelerometer, the following symbols will be used.

$m_1$=mass of the float
$m_2$=mass of fluid displaced by float
$k_1$=constant relating fluid flow past the float to the pressure difference between the two sides of chamber 5
$k_2$=constant relating fluid flow to the total pressure drop in the entire circuit
$Q$=quantity of fluid flow per unit time
$\mu$=fluid viscosity
$R$=effective radius of helical passage
$N$=number of turns in helix
$A$=cross sectional area of tube 14
$a$=acceleration applied to device in an axial direction
$\dot{\omega}$=angular acceleration of casing 26
$\rho$=fluid density
$v$=volume of float Using the above symbols and equating the force on the float due to acceleration to that due to fluid flow past the float we get:

$$A k_1 \mu Q = (m_1 - m_2) a$$

Furthermore, the fluid flow is due to the pressure generated by angular acceleration of the fluid contained in the helical passageway.

$$k_2 \mu Q = 2\pi \dot{\omega} R^2 N \rho$$

These two equations may be combined to yield the following $$\dot{\omega} = \frac{k_2 (m_1 - m_2)}{2\pi R^2 N \rho A k_1} a$$

or $$\dot{\omega} = \frac{k_2 \left(\frac{m_1}{\rho} - v\right)}{2\pi R^2 N A k_1} a$$

This expression gives the scale value of the unit, that is it gives a value of angular acceleration, $\dot{\omega}$, corresponding to a given linear acceleration, $a$. The various terms in this expression are related to various physical dimensions and the fluid density and can all be made very stable with time. Proper selection of materials and dimentions will make the various temperature expansion coefficients mutually compensating and hence remove any sensitivity of scale value to temperature changes.

It is to be noted that $k_2$ is a factor in the scale value; desirable adjustments in scale value are thus possible by adjustment of the valve, 17, which influences the value of $k_2$.

The preceding discussion has asumed that the float is kept in a balanced condition by equating axial acceleration forces to the forces produced by the pressure difference across the float, which in turn is proportional to the angular acceleration of the helical passage. It is evident that if balance is not precisely achieved the float will move in an axial manner. Keeping the float in a fixed position will thus asure that the desired force balance is maintained. Only negligible errors will result if a small axial float displacement is allowed.

For an understanding of the manner of operation of the apparatus of FIG. 1, reference is first made to FIG. 4 and particularly that part of it which illustrates the manner in which the signal pick-ups control the motor 28. When using capacity type pick-ups, a high frequency power supply is desirable as shown at 35. This power supply feeds one plate of both pairs of plates of the pick-ups through a coupling transformer 36, the secondary thereof having a grounded midtap. For example, lead 37 connects with plate 20 of one pick-up while lead 38 connects with plate 22 of the other pick-up. The remaining plates 19 and 21 are connected together and through lead 39 to an amplifier indicated generally at 40. To this amplifier is also supplied a reference voltage from the high frequency power supply by means of leads 41 and 42. Amplifier 40 may be of a conventional type including a detector stage for providing a D.C. signal having a polarity depending upon the phase sense of the signal derived from lead 39. The detector stage may then feed into a modulator stage which provides an output on leads 43, 44 which is of a frequency corresponding to that of an alternating current source 45 and which has a phase sense depending upon the polarity of the D.C. signal. In other words, amplifier 40 converts the high frequency, reversible phase, variable magnitude signal derived from the capacity pick-ups to a similar reversible phase, variable magnitude signal but at the lower frequency of source 45, which latter signal varies in magnitude and phase with variations in magnitude and phase of the pick-up signal. This arrangement is merely for the purpose of converting the signal from one frequency to another to suit the particular arrangement shown. The output of amplifier 40, appearing across leads 43 and 44, is, in the embodiment illustrated, supplied to the accelerometer drive motor 28, such for example as a two-phase motor.

The operation of that part of the accelerometer above described is as follows. First, assume that platform 34 is disposed in a horizontal plane with the longitudinal axis 10 of the accelerometer and motor disposed to parallel the direction of the acceleration to be detected and, further, assume that conditions have been established such that the pick-ups are supplying the signal required to cause amplifier 40 to drive motor 28 at the desired bias speed. Then, let us assume that a linear acceleration occurs in the direction of axis 10. This will cause the float to move longitudinally of the chamber in a direction dependent upon the direction of the acceleration force. When this occurs, the two condenser plates at one end of the chamber will be more closely coupled through the cooperation therewith of the end of the float adjacent thereto, the end of the float being moved closer to one pair of plates varying the reactance and thereby increasing the magnitude of the signal flowing between adjacent plates. At the same time, the signal coupled through the other pair of adjacent plates at the other end of the chamber is reduced in magnitude. Since the high frequency current supplied to the plates of both pairs are 180° out of phase, the resultant signal output will be zero when like capacitance values are present between the plates of each pair. However, when movement of the float occurs, this balance will be disturbed and one condenser will pass more current than the other so that the dominating signal or resultant signal output will be of a phase depending upon the direction of movement of the float and of an amplitude depending upon the amount of such movement. This signal is derived from the brush and slip ring arrangement and supplied to amplifier 40 which drives motor 28.

If the gain of amplifier 40 is quite high then the signal produced as a result of only a very small displacement of the float will cause motor 28 to angularly accelerate casing 26 as required to balance the effect of the axial acceleration of the accelerometer by circulation of the fluid through the chamber. For this operation to be properly completed it is necessary for the sense of the angular acceleration to be proper and for the well known requirement for the stability of closed loop systems to be met. The inherent relationship between the angular acceleration of the device and the resultant pick-off output is such as to make stability easy to achieve.

It is characteristic of two phase motors used for control purposes to require that a voltage appear across the input terminals to maintain a constant speed. Furthermore, there will be losses such as friction and windage associated with rotation of the accelerometer and these must be accounted for by motor 28. For these reasons it is evident that in normal operation there must be an output from amplifier 40 due to the bias speed and to any changes from the bias speed which accompany normal operation. Such an amplifier output can be maintained as the result of a corresponding output from the capacitive pick offs and, hence, as a result of a small axial displacement of the float. As was previously indicated, no important error will result if a small displacement exists.

Any change in angular speed which results from an applied acceleration along axis 10 will be maintained after the termination of the acceleration because any tendency to change angular speed would cause disturbance to the float force balance and produce a correcting signal.

FIG. 4 depicts the use of a differential 46 and synchronous motor 47 which operate to subtract from the angular velocity of shaft 31 a constant speed equal to the previously discussed bias speed, in order that the output of output shaft 48 will contain only the second time integral of the applied acceleration and will not be affected by the bias speed. Gear reduction units 49 and 50 may be employed.

When the apparatus is subjected to linear accelerations in the direction of its axis 10, the signal or change in signal from the pick-ups will cause motor 28 to accelerate. The angular acceleration of the generally helical passageway will produce a pressure differential within chamber 5, increasing the fluid pressure to one side of the central restriction while decreasing the fluid pressure on the other side thereof. The differential pressures acting on the float will supply a force thereto in a direction opposite to that of the linear acceleration. The extremely small passageway between the tubular portion 14 of the inertial mass and the restricting wall 9 permits this differential pressure to be built up within the chamber while at the same time fluid may pass through this narrow passageway so as to equalize pressures within the chamber when angular accelerations or decelerations of the fluid system go to zero. With this arrangement, it will be seen that any linear acceleration occurring in the direction of axis 10 will produce an angular acceleration of motor 28 and since this angular acceleration results in a force opposing the linear acceleration, the motor control system will operate to increase the angular acceleration until the resultant force produced by the liquid on the float equals the acceleration force. In other words, the angular acceleration will be made equal to the linear acceleration. Upon termination of the linear acceleration, the motor 28 will continue to drive at that speed to which it was accelerated and, in the absence of a further linear acceleration or deceleration, at a constant speed so that the output shaft 31 thereof will be displaced through an angular amount proportional to the second time integral of the linear acceleration.

In practice, I prefer, as above indicated to operate the rotatable assembly of my accelerometer at some initial constant speed in the absence of linear accelerations so as to reduce friction drag while at the same time spinning chamber 5 so as to cause the float to align its longitudinal axis in coincidence with the axis of rotation 10. Therefore, the float will be continuously maintained in spaced relation to the restriction in the chamber without the use of supporting members such as springs, wire supports and the like, while longitudinal movement of the mass is substantially unopposed. The operation of the accelerometer when subjected to this initial predetermined rotation at constant speed, will be exactly the same as in the case when the rotatable assembly is not rotated at some bias speed when initially set up and in the absence of linear accelerations.

In FIG. 4, the output shaft 48 is illustrated as connected to any suitable type of output device which will provide a measure of displacement. For example, as indicated generally at 51, such a device may be of the electrical type, such as a selsyn, the output of which may be supplied as a voltage to a system employing such a signal or it may be supplied to a suitable meter or a follow-up servomotor loop which in turn drives a suitable indicator, or, the device 51 may be a mechanical indicator such as a Veeder-Root counter, and the like. In all cases, the indicating device 51 supplies a measure of the angular displacement through which the output shaft 31 of motor 28 is rotated. If the system were not operated with an initial predetermined constant speed in the absence of linear accelerations, shaft 31 could be connected directly preferably through suitable gear reduction units and the like to the indicating device 51. However, in order to eliminate this initial predetermined constant bias speed, I interpose the above described differential, which may be electrical or mechanical between shaft 31 and the output or indicating device.

In FIG. 5 I have shown a test set-up for the purpose mainly of illustrating one manner in which the accelerometer of the present invention may be initially placed in operating condition and tested. The accelerometer casing 26 as hereinabove described is driven by motor 28 in accordance with signals derived from the pick-ups which are supplied to amplifier 40. The base 34 supporting the rotatable assembly and motor is illustrated in FIG. 5 as including dependent end flanges 52 and 53 in which is journalled a shaft 54 provided with a worm 55 which meshes with a gear sector 56. Gear sector 56 is fixedly secured to a base 57 so that rotation of worm 55 in engagement with sector 56 will adjust the longitudinal axis of the accelerometer relative to horizontal. The platform 34, for this purpose, is provided with supporting flanges 58 (one of which is shown) which pivot the accelerometer and its supporting platform about shaft 59. The output of differential 46, in the test set-up, not only drives the output device 51, but also through gearing 60 drives worm shaft 54. A potentiometer 61 is mounted on flange 52 and the wiper thereof is operatively connected to worm shaft 54. The potentiometer is illustrated as energized from power source 35 which is the high frequency power supply shown in FIG. 4 and which also energizes the pick-ups. The output of the potentiometer is supplied through lead 62 to amplifier 40 thereby supplying an additional signal to the motor control amplifier.

In operation, it is assumed for illustration purposes that the base 57 of the test set-up is fixed in a horizontal position. It is therefore desirable if horizontal linear accelerations are to be detected that the longitudinal axis 10 of the accelerometer be positioned horizontal while operating at its bias speed in the absence of linear accelerations to which it will respond. When the accelerometer system is initially energized there may be some tilt to the accelerometer platform producing an error signal output from the accelerometer due to the influence of gravity thereon. The motor 47 which functions to subtract the bias speed from the output of the device will drive into differential 46 while at the same time motor 28 will also drive into the differential. The speed of motor 47 will quickly become a constant while the speed of motor 28 will depend upon the accelerator output. The difference of these speeds will result in a rotation of the output shaft 48 of the device which through gearing 60 will drive worm 55. This will result, of course, in a change in the angular position of the accelerometer platform about shaft 59, i.e., its pivotal axis. At the same time, rotation of worm shaft 54 will operate potentiometer 61 supplying an output therefrom. Hence, the resultant signal from the accelerometer pick-ups and the potentiometer will upon initial energization cause motor 28 to accelerate. Acceleration of motor 28 will operate to zero-out any initial spurious error from the accelerometer and to offset the effect of the acceleration due to gravity acting on the instrument. At the same time, the resultant output from differential 46 will adjust the angular position of the accelerometer relative to horizontal and drive the potentiometer toward its zero signal position. Since the accelerometer system operates in accordance with a second order differential equation as hereinabove shown, the signals will control motor 28 in such manner as to accelerate it toward its predetermined bias speed which will be equal to that of motor 47 while leveling the accelerometer platform and removing spurious initial errors due to float displacement within the chamber. When the accelerometer platform has been so adjusted to a level position with the axis of the accelerometer horizontal, the potentiometer signal will then have been reduced to zero and the output from the accelerometer pick-ups will be of such value as to drive motor 28 at an angular velocity equal to that of motor 47. The accelerometer is now adjusted for acceleration detection purposes, operating at its bias speed and with zero output on the output shaft 48 of differential 46 in the absence of a detected linear acceleration. A clutch 63, illustrated in FIGS. 4 and 5, may now be energized to connect the output device 51 with the output shaft 48 of the accelerometer. As shown in FIG. 4, a zeroing device indicated schematically at 64 may be employed for initially adjusting the output device to a zero output condition. Any suitable type of zeroing equipment may be used depending, of course, upon the type of output device or indicator used.

I have in the foregoing specification and in the accompanying drawings, disclosed a preferred arrangement of my accelerometer, but it will be understood that some of the particular structural details are mainly employed for the purpose of providing a somewhat simplified and readily understandable disclosure. For example, the helical passageway formed by the helically wound tubular element is preferably formed in a solid mass in which the various passages may be cast, machined, drilled, and the like. Moreover, the instrument, per se, may be wholly enclosed within a heat insulating enclosure and, if desired, heating elements may be supplied therein with thermostatic controls for maintaining substantially uniform temperature conditions throughout the enclosure.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. In an accelerometer, a fluid circulating member including a fluid, a fluid filled, cylindrical chamber having a longitudinal axis, a mass buoyantly supported in the chamber by the fluid for movement along the axis responsive to the influence of acceleration having a geometrical shape that is symmetrical to the axis and that with a portion of the wall of the chamber provides a restrictive axial passageway for the fluid between the respective ends of the chamber, a fluid filled, helical conduit with one end connected to the chamber at one side of the restrictive passageway and with the other end connected to the chamber at the other side of the restrictive passageway, means for supporting the conduit for rotation about its longitudinal axis to circulate fluid through the chamber and thereby exert a differential fluid pressure on the buoyant mass equal and opposite to the influence of acceleration, means for providing an output dependent on the movement of the mass from a null position along the axis of the chamber, and means for rotating the conduit at a speed depending on the output of said output providing means.

2. An accelerometer as claimed in claim 1, in which the axis of the conduit and the axis of the chamber are coincident, and the chamber is connected to the conduit to rotate with the conduit in response to the operation of said rotating means.

3. An accelerometer as claimed in claim 1, in which the mass is a cylindrical dumbbell one end of which is located in one end of the chamber and the other end of which is located in the other end of the chamber.

4. An accelerometer as claimed in claim 1, in which the rotating means includes a motor operatively connected to the conduit, and means for operating the motor to rotate the conduit at a predetermined speed, and where the output means is connected to the motor to change the speed of rotation of the conduit depending on its output.

5. An accelerometer as claimed in claim 1, in which said member includes valve means for adjusting the circulating of fluid through the chamber.

6. An accelerometer as claimed in claim 1, including a connection from one end of the conduit to the one end of the chamber that extends in an axial direction to the other end of the chamber, and a connection from the other end of the conduit to the other end of the chamber that extends in an axial direction to the one end of the chamber.

7. An accelerometer as claimed in claim 1, in which the rotating means includes a motor operatively connected to the conduit, and means for operating the motor to rotate the conduit at a predetermined speed, where the output means is connected to the motor to change the speed of rotation of the conduit depending on its output, and including means providing a measure of the angular displacement of the motor due to the operation thereof by the output means.

8. In an accelerometer, a fluid circulating member including a fluid, a fluid filled, cylindrical chamber, a float supported in the chamber by the fluid for displacement along the longitudinal axis of the chamber responsive to the influence of acceleration having a geometrical shape that is symmetrical to the axis and that with a portion of the wall of the chamber provides a restrictive axial passageway for the fluid between the respective ends of the chamber, a fluid filled, helical conduit with ends respectively connected to the chamber at opposite sides of the restrictive passageway, means for supporting the conduit for rotation about its longitudinal axis to circulate fluid through the chamber and thereby exert a differential fluid pressure on the float equal and opposite to the influence of acceleration, a pick-up providing a signal in accordance with the displacement of the float from a null position along the axis, and means for rotating the conduit including a motor operable in accordance with the signal of the pick-up.

9. An accelerometer as claimed in claim 8, in which the rotating means is connected to rotate the chamber about its longitudinal axis.

10. An accelerometer as claimed in claim 8, in which the diameter of the chamber at its respective ends is greater than the diameter of the restrictive wall portion of the chamber.

11. An accelerometer as claimed in claim 8, including means for operating the motor to rotate the conduit at a predetermined speed, and the pick-up is connected to the motor to change the speed of rotation of the conduit.

12. An accelerometer as claimed in claim 8, including means for operating the motor to rotate the conduit at a predetermined speed, the pick-up is connected to the motor to change the speed of rotation of the conduit, and including means providing a measure of the angular displacement of the motor due to the operation thereof by the signal of the pick-up.

13. An accelerometer comprising a member for circulating fluid including a fluid filled, cylindrical chamber, a mass buoyantly supported in the chamber by the fluid for displacement along the longitudinal axis of the chamber responsive to the influence of acceleration having a geometrical shape that is symmetrical to the axis and that with a portion of the wall of the chamber provides a restrictive axial passageway for the fluid between the respective ends of the chamber, a fluid filled, helical conduit with one end connected to the chamber at one side of the restrictive passageway and with the other end connected to the chamber at the other side of the restrictive passageway, means for mounting the conduit and chamber with the longitudinal axis of the conduit coincident to the axis of the chamber, means for supporting the mounting means for rotation about the axis of the conduit and chamber to circulate fluid through the chamber and thereby exert a differential pressure on the mass equal and opposite to the influence of acceleration, a pick-up providing a signal in accordance with the displacement of the mass from a null position along the axis, means for rotating the mounting means including a motor operable in accordance with the signal of the pick-up, means for operating the motor to rotate the mounting means at a predetermined speed, and means providing a measure of the angular displacement of the motor due to the operation thereof by the signal of the pick-up.

14. An accelerometer as claimed in claim 13, in which the mass is a cylindrical dumbbell one end of which is located in one end of the chamber and the other of which is located in the other end of the chamber.

15. An accelerometer as claimed in claim 13, including valve means situated in the connections between the conduit and chamber for adjusting the circulation of fluid through the chamber.

References Cited in the file of this patent

UNITED STATES PATENTS

| | | |
|---|---|---|
| 2,801,097 | Adamson | July 30, 1957 |
| 2,814,768 | Kinkel | Nov. 26, 1957 |
| 2,861,789 | Pope | Nov. 25, 1958 |

OTHER REFERENCES

Article, "Directly Double-Integrating Accelerometer" (Pope), from "Aviation Age," January 1958, pages 50, 54 and 55.